UNITED STATES PATENT OFFICE.

GIULIO MORPURGO, OF TRIESTE, AUSTRIA-HUNGARY, ASSIGNOR TO ERSTE TRIESTER-REISSCHÄL-FABRIKS-AKTIEN-GESELLSCHAFT, OF TRIESTE, AUSTRIA-HUNGARY.

MANUFACTURE OF SIZING OR FINISHING MEDIA.

No. 849,413.     Specification of Letters Patent.     Patented April 9, 1907.

Application filed October 20, 1905. Serial No. 283,703.

*To all whom it may concern:*

Be it known that I, GIULIO MORPURGO, of the city of Trieste, Province of Istria, and Empire of Austria, chemist, having invented certain new and useful Improvements in the Manufacture of Sizing or Finishing Media, do hereby declare that the following is a full, clear, and exact description of the same.

The present invention relates to the manufacture of sizing or finishing media, the object being to produce such a medium from substances containing starch and gluten, which is especially suitable for the most various finishing requirements.

The characteristic of the present invention consists in that starchy or glutinous substances or an artificial mixture of starch and gluten, preferably rice rich in gluten or ordinary rice mixed with gluten, is first moderately steamed so as to loosen the tissue and then mixed with substances having an alkaline reaction, so as to separate the proteins, and finally mixed with a solution of an organic acid. The product is then dried at a temperature under 100° centigrade and the dried product ground to powder. For separating the proteins ammonium carbonate is preferably used; but other alkaline substances may be employed, such as soda, lime, chalk, barites. As the organic acid, lactic acid has been found to be preferable.

The process of manufacture is as follows: A glutinous rice or ordinary rice mixed with gluten, so that the product contains eight per cent. of gluten, is moderately steamed, so as to loosen the tissue. The product is then allowed to stand until it is completely cold, when it is mixed with a fifty-per-cent. solution of ammonium carbonate with a view to separating out the proteins, (one part ammonium carbonate to twenty parts of the protein contained.) After being allowed to stand for one hour the rice thus disintegrated is mixed with a solution of lactic acid (two parts anhydrous acid to eight parts protein) and thoroughly stirred together until the mass is perfectly homogeneous. The amount of water used in the solution may be from fifty to one hundred parts. The mixture is then dried at a temperature not exceeding 100° centigrade. If desired, suitable ventilation may be provided for removing the arising vapors, and the product is finally ground and passed through a sieve.

Instead of adding lactic acid to the product it can be produced in the rice-powder itself by means of lactic ferments. If vinegar is used instead of the lactic acid, it can be produced in the rice by any suitable process of fermentation.

Having thus described my invention, what I claim, and desire to secure by Letters Patent, is—

1. The herein-described process for manufacturing sizing or finishing media which consists in steaming a substance containing starch and gluten to loosen the tissue, then mixing the substance with a substance having an alkaline reaction so as to disintegrate the proteins, then mixing the product with a solution of an organic acid, and finally drying the mass at a temperature under 100° centigrade.

2. The herein-described process for manufacturing sizing or finishing media which consists in steaming a substance containing starch and gluten to loosen the tissue, then mixing the substance with a solution of ammonium carbonate, then mixing the product with a solution of lactic acid and thoroughly stirring the mass, then drying the mass at a temperature under 100° centigrade, grinding the dried mass and passing it through a sieve.

In testimony whereof I affix my signature in presence of two witnesses.

GIULIO MORPURGO.

Witnesses:
    ROBT. W. HEINGARTNER,
    VINCENT BURES.